United States Patent
Brilliant et al.

(10) Patent No.: US 12,196,180 B2
(45) Date of Patent: Jan. 14, 2025

(54) WIND TURBINE COMPRISING A LIGHTNING PROTECTION SYSTEM

(71) Applicant: Vestas Wind Systems A/S, Aarhus N (DK)

(72) Inventors: Nathan A. Brilliant, Arvada, CO (US); Anders Niels Hansen, Langå (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 17/766,882

(22) PCT Filed: Oct. 7, 2020

(86) PCT No.: PCT/DK2020/050271
§ 371 (c)(1),
(2) Date: Apr. 6, 2022

(87) PCT Pub. No.: WO2021/069040
PCT Pub. Date: Apr. 15, 2021

(65) Prior Publication Data
US 2024/0110547 A1    Apr. 4, 2024

Related U.S. Application Data

(60) Provisional application No. 62/912,178, filed on Oct. 8, 2019.

(30) Foreign Application Priority Data

Dec. 4, 2019   (DK) .......................... PA 2019 70746

(51) Int. Cl.
*F03D 80/30* (2016.01)
*F03D 80/70* (2016.01)

(52) U.S. Cl.
CPC ............. *F03D 80/30* (2016.05); *F03D 80/70* (2016.05); *F05B 2240/50* (2013.01)

(58) Field of Classification Search
CPC ......... F03D 80/30; F03D 80/301; F03D 80/70
See application file for complete search history.

(56) References Cited

U.S. PATENT DOCUMENTS 9,334,852 B2 * 5/2016 Olsen ...................... F03D 80/30

FOREIGN PATENT DOCUMENTS

| CN | 208236584 U | 12/2018 |
|----|-------------|---------|
| CN | 209244740 U | 8/2019  |

(Continued)

OTHER PUBLICATIONS

Danish Patent and Trademark Office, Search and Examination Report in PA 2019 70746, Aug. 13, 2020.

(Continued)

*Primary Examiner* — Jared Fureman
*Assistant Examiner* — Christopher J Clark
(74) *Attorney, Agent, or Firm* — Wood Herron & Evans LLP

(57) ABSTRACT

The present invention provides a wind turbine comprising a lightning protection system for providing an electrical conduction path suitable for conducting lightning from the rotor to electrical ground. The lightning protection system comprises a shroud which is electrically coupled to a wind turbine bearing housing and a wind turbine hub and/or the front end of the main shaft. The shroud forms part of the electrical conduction path so to electrically couple a wind turbine rotor to the bearing housing via a short circuit path that bypasses the bearing arrangement.

18 Claims, 7 Drawing Sheets

(56) References Cited

FOREIGN PATENT DOCUMENTS

| | | |
|---|---|---|
| DE | 102004010104 A1 | 9/2005 |
| DE | 102004022299 A1 | 12/2005 |
| EP | 2336560 A1 | 6/2011 |
| EP | 2395238 A1 | 12/2011 |
| EP | 2520796 A1 | 11/2012 |
| EP | 2889476 A1 | 7/2015 |
| EP | 3628864 A1 | 4/2020 |
| WO | 2005050008 A1 | 6/2005 |
| WO | 2015058771 A1 | 4/2015 |
| WO | 2018153520 A1 | 8/2018 |

OTHER PUBLICATIONS

European Patent Office, International Search Report and Written Opinion in PCT Application No. PCT/DK2020/050271, Dec. 16, 2020.

\* cited by examiner

WIND TURBINE COMPRISING A LIGHTNING PROTECTION SYSTEM

FIELD OF THE INVENTION

The present invention is in the field of wind turbines and specifically wind turbine lightning protection systems.

BACKGROUND OF THE INVENTION

Wind turbines may be struck by lightning in a lightning storm due to their height. The electric current within a typical negative cloud to ground lightning discharge rises very quickly to its peak value in 1-10 microseconds, then decays more slowly over 50-200 microseconds. This electric current when striking the blade of a wind turbine travels to ground via the lowest impedance path. Without any lightning protection, this path generally comprises the bearings of a wind turbine which allows the hub and blades to rotate freely. Such a large electric current through these bearings can cause damage to the bearings.

To protect the bearings of a wind turbine many protection systems have been developed. One such protection system is achieved by mounting a spark gap device on the nacelle so that when electric current travels along or down the blade (after being struck by lightning), the high electric current ionises the surrounding air across the spark gap to produce a current path which avoids the bearings. One purpose of the spark gap is to not impede rotation of the wind turbine, between the hub and the nacelle. However, this produces Radio Frequency interference as the spark gap is active which can be undesirable, moreover, the proportion of the total electric current which takes the spark gap route can be unpredictable and bearings may still be damaged.

Lightning protection systems that have a direct connection between the blade and the nacelle exist, such as in WO2005/050008 A1. This describes a lightning current transfer unit (LCTU) which comprises at least two sliding contacts adapted to connect a blade and the nacelle or tower. The LCTU further comprises at least one electric conductor establishing a dedicated connection between surfaces that the two sliding contacts are contacting. The sliding contact on the blades is typically in contact with a blade band which is a metallic band surrounding the circumference of a blade root end.

It is important for the blade band to be at least a minimum distance away from metallic parts joining the blade root to the hub, so that the preferred current path is via the LCTU. The trend is for larger and longer blades and as blade length increases the location of this blade band may be outside the extremities of the front face of the nacelle. Therefore, the LCTU solution places design constraints on the physical components of the blade and the nacelle to prevent arcing between parts that are at different voltages. At a certain blade length physical limits will be reached for the LCTU solution and an alternative is needed.

SUMMARY OF THE INVENTION

A first aspect of the invention provides a wind turbine comprising: a rotor comprising a hub and a plurality of blades that project outwardly from the hub; a main shaft attached to the hub at a front end and extending to a gearbox or generator at a rear end; a bearing housing for rotatably supporting the main shaft via a bearing arrangement; and a lightning current protection system providing an electrical conduction path suitable for conducting lightning from the rotor to electrical ground, wherein the bearing housing is electrically connected to electrical ground, the lightning current protection system includes a shroud forming part of the electrical conduction path, wherein a rear end of the shroud is in contact with the bearing housing and a front end of the shroud is in contact with the hub and/or the front end of the main shaft, and the shroud electrically couples the rotor to the bearing housing via a short circuit path that bypasses the bearing arrangement, wherein the shroud is arranged around the front end of the main shaft.

The shroud may have a greater diameter than the main shaft at the contact with the bearing housing.

The wind turbine of the first aspect, may further comprise a nacelle containing the bearing housing, wherein the shroud is enclosed within the nacelle, The shroud may make a sliding or rolling contact with either: (i) the hub and/or the front end of the main shaft; or (ii) the bearing housing, and the sliding or rolling contact provides electrical coupling.

The shroud may make a sliding contact with either: (i) the hub and/or the front end of the main shaft; or (ii) the bearing housing at a plurality of discrete contact points around the circumference of the shroud.

The shroud may be electrically coupled by at least one fixed contact at either the front or rear end of the shroud and electrically coupled by at least one sliding or rolling contact at either the rear or front end of the shroud.

The shroud may comprise a plurality of metal leaves biased in contact with either the bearing housing or the hub and/or the front end of the main shaft. The shroud may alternatively comprise a metal mesh, grid or net.

The shroud which may comprise a metal mesh, grid or net, may further comprise a band or hoop for biasing the shroud in sliding contact with either: (i) the hub and/or the front end of the main shaft; or (ii) the bearing housing.

The shroud may have a relatively small thickness. Preferably, the thickness of the shroud is less than 10 mm.

The front end of the main shaft may have a flared end which attaches to the hub; the shroud may be in contact with the bearing housing and the flared end of the main shaft; and the shroud may electrically couple the flared end of the main shaft to the bearing housing. The flared end of the main shaft may have a diameter at the contact with the shroud which is greater than a diameter of the bearing housing at the contact with the shroud.

The lightning current protection system may avoid an air gap, or spark gap, in the electrical conduction path for conducting lightning from the hub to electrical ground.

The shroud may include copper.

The bearing housing may include steel.

At least one of the plurality of blades may include an electrically powered component which receives electrical power via the hub.

There may be at least two electrical conduction paths from the rotor to electrical ground, one via the shroud and one via the main shaft and/or the bearing arrangement.

The preferred electrical conduction path from the rotor to electrical ground for a DC current may be via the main shaft and/or the bearing arrangement.

The preferred electrical conduction path from the rotor to electrical ground for a transient lightning current may be via the shroud.

These and other aspects, features and/or advantages of the invention will be apparent from and elucidated with reference to the embodiments described hereinafter.

BRIEF DESCRIPTION OF THE DRAWINGS

Embodiments of the invention will now be described with reference to the accompanying drawings, in which:

FIG. 5b illustrates, in a schematic side view, the example of a shroud of FIG. 3a.

DETAILED DESCRIPTION OF EMBODIMENT(S)

Figure 1A:
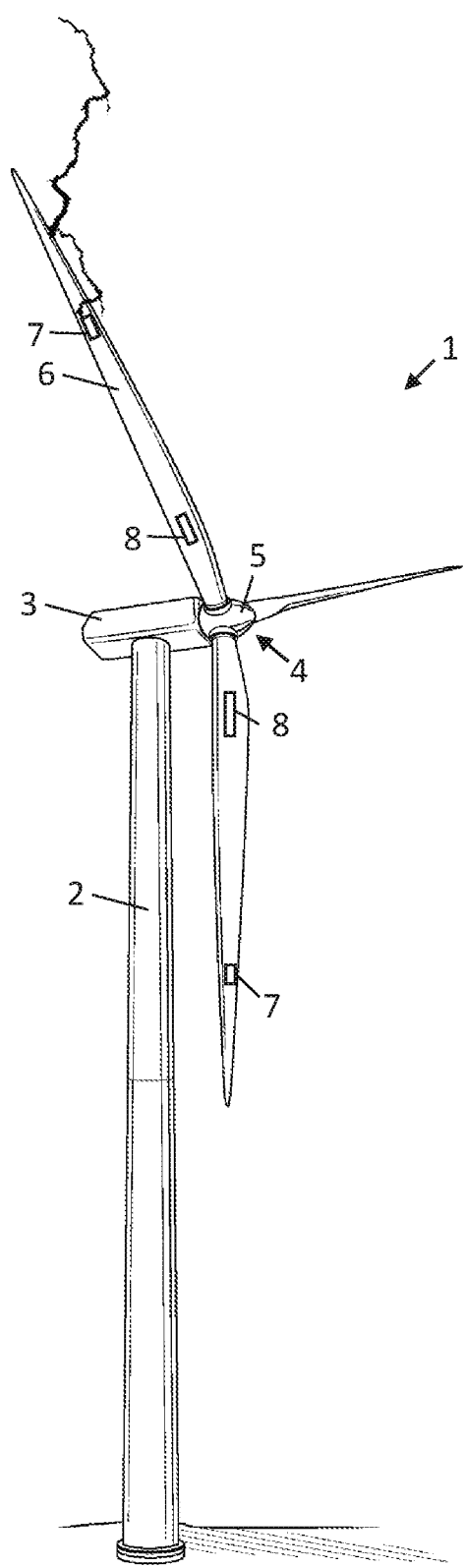
FIG. 1a illustrates, in a schematic perspective view, an example of a wind turbine.

FIG. 1a illustrates, in a schematic perspective view, an example of a wind turbine 1. The wind turbine 1 includes a tower 2, a nacelle 3 at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1.

The rotor 4 of the wind turbine includes a central hub 5 and a plurality of blades 6 that project outwardly from the central hub 5. It will be noted that the wind turbine 1 is the common type of horizontal axis wind turbine (HAWT) such that the rotor 4 is mounted at the nacelle 3 to rotate about a substantially horizontal axis defined at the centre at the hub 5. While the example shown in FIG. 1 has three blades, it will be realised by the skilled person that other numbers of blades are possible.

When wind blows against the wind turbine 1, the blades 6 generate a lift force which causes the rotor 4 to rotate, which in turn causes the generator within the nacelle 3 to generate electrical energy.

On each rotor blade 6 there is at least one lightning receptor 7 or covering mesh, positioned at a desirable location for lightning to strike the wind turbine. Further, there may be on at least one of the plurality of blades 6 an electrically powered component 8 which receives electrical power via the hub, such as a de-icing unit, lighting unit, etc. Electrically powered components in the blades require protection from lightning strikes, in part due to their power connection via the hub.

The wind turbine 1 may be included among a collection of other wind turbines belonging to a wind power plant, also referred to as a wind farm or wind park, that serve as a power generating plant connected by transmission lines with a power grid. The power grid generally comprises a network of power stations, transmission circuits, and substations coupled by a network of transmission lines that transmit the power to loads in the form of end users and other customers of electrical utilities.

Figure 1B:
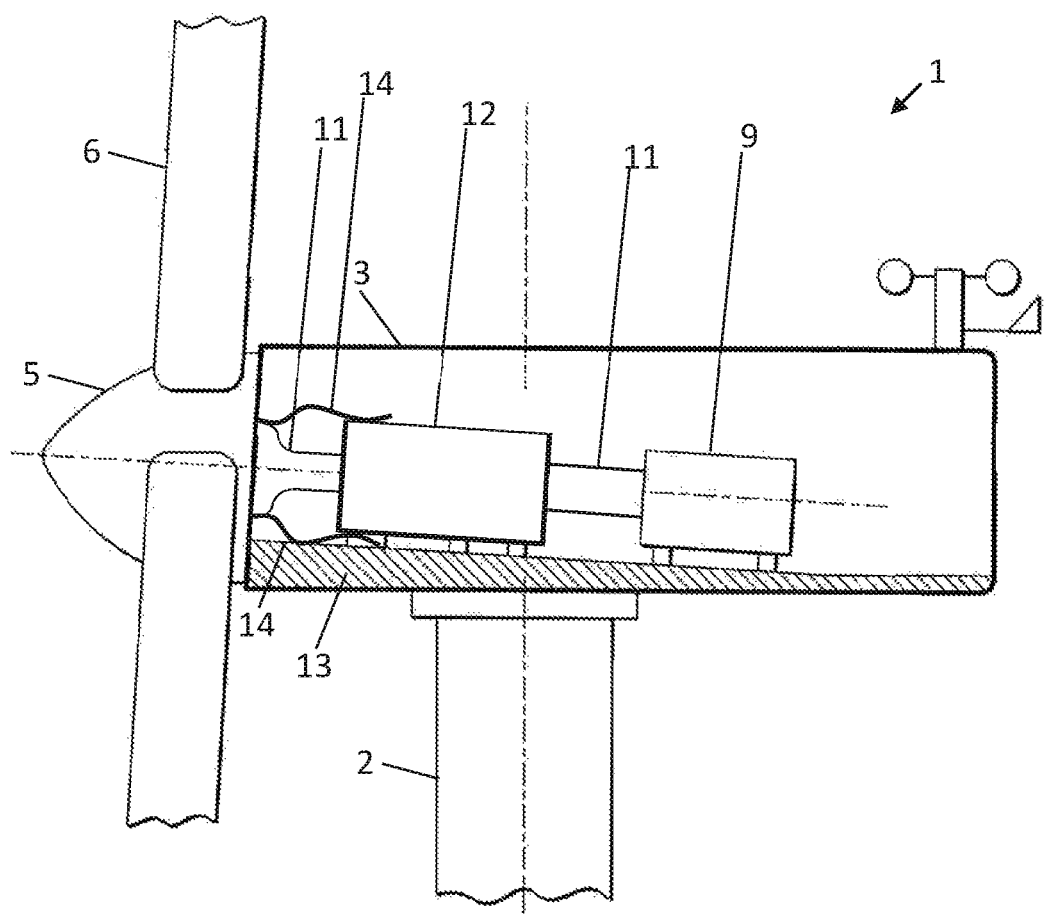
FIG. 1b illustrates, in a schematic side view, an example of a wind turbine according to the invention.

FIG. 1b schematically illustrates, an embodiment of the wind turbine 1 and illustrates the inside of the nacelle 3. The nacelle 3 comprises a nacelle frame 13 which structurally supports the nacelle 3 and the components within the nacelle 3. The wind turbine 1 comprises rotor blades 6 which are mechanically connected to an electrical generator 10 via gearbox 9. In direct drive systems, and other systems, the gearbox 9 may not be present. The electrical power generated by the generator 10 is injected into a power grid via an electrical converter (not shown). A main shaft 11 is mechanically attached to the hub 5 at a front end. A bearing housing 12 is mechanically attached to the nacelle frame 13 and is configured to rotatably support the main shaft 11 such that the bearing housing 12 supports the hub 5 and the plurality of blades 6 to allow them to rotate relative to the nacelle 3. The main shaft 11 extends through the bearing housing 12 and into the gearbox 9 (or electrical power generator 10 in a direct drive system) at a rear end.

The lightning protection system is also illustrated in FIG. 1b. The lightning protection system provides an electrical conduction path suitable for conducting lightning from the rotor 4 to electrical ground. The lightning current protection system includes a shroud 14 forming part of the electrical conduction path. FIG. 1b illustrates the shroud 14 in contact with the bearing housing 12 at a rear end, and the rotor 4, specifically FIG. 1b illustrates the shroud in connection to the main shaft 11 at a front end. Alternatively, the front end of the shroud 14 may be in contact with the hub 5, any intermediate component (not shown), or any combination of blades 6, the hub 5, the main shaft 11, the bearing housing 12, and the nacelle frame 13. The shroud 14 is arranged around the front end of the main shaft 11. The shroud 14 may partially or fully enclose, or surround the circumference, the front end main shaft 11 between where the shroud makes contact with the hub 5 and/or the front end of the main shaft 11, and the bearing housing 12.

The arrangement of the shroud 14 around the front end of the main shaft 11 promotes the skin effect such that, when lightning current passes along the electrical conduction path via the shroud 14, a bearing arrangement of the bearing housing 12 is not damaged in a lightning strike, or, such that a greater proportion of lightning current passes via the shroud than the bearing arrangement. The nacelle 3 may contain the bearing housing 12 and the shroud 14 may be enclosed within the nacelle 3.

Figure 2A:
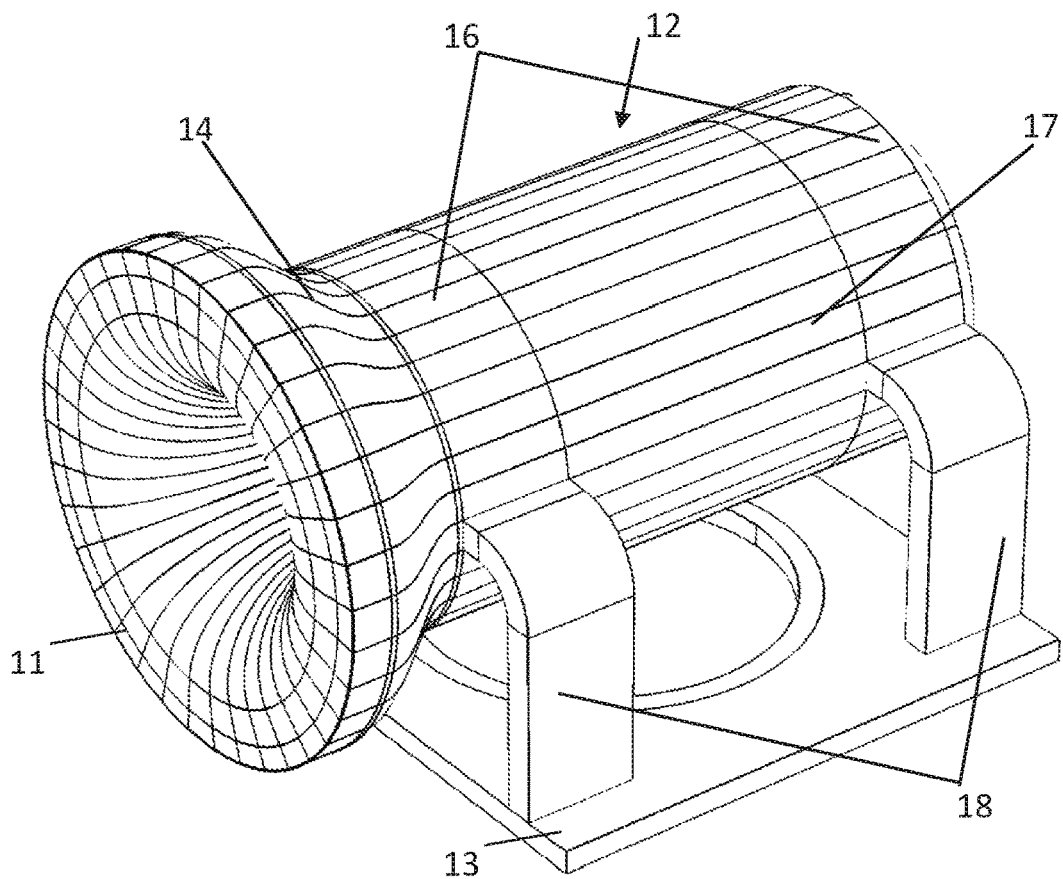
FIG. 2a illustrates, in a schematic perspective view, an example of a main shaft, the bearing housing, and a shroud.
Figure 2B:
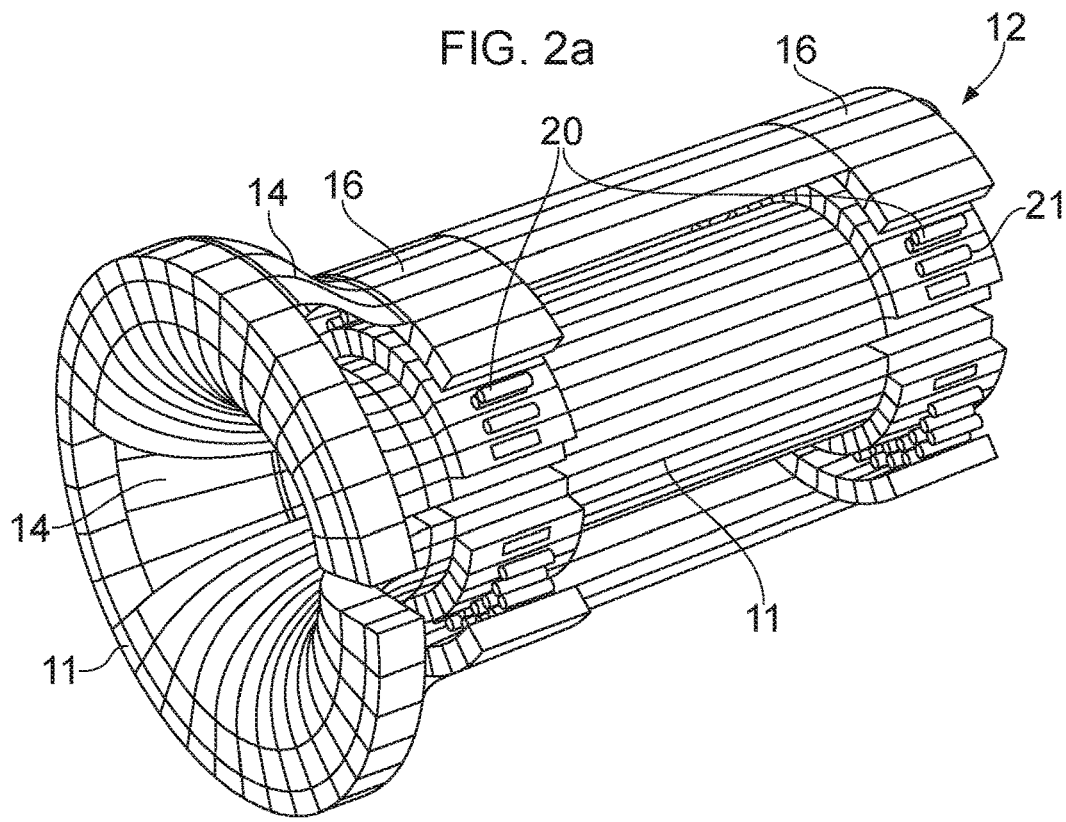
FIG. 2b illustrates, in a partially sectional view of FIG. 2a, further illustrating a bearing arrangement behind the bearing housing.

FIGS. 2a and 2b illustrates the shroud 14 connection to the front end of the main shaft 11 and to the bearing housing 12 in more detail. The bearing housing 12 may comprise bearing races 16 (e.g. front and rear bearing races), a cover 17, and structural supports 18 mechanically attached to the nacelle frame 13. For structural strength the bearing housing 12 may comprise: steel, an alloy, an alloy comprising steel, a suitable composite, or a combination of these. It is of note that the bearing housing 12 may have an associated electrical conductivity depending on the material selection.

FIG. 2b illustrates the main shaft 11, the shroud 14, and bearing housing 12 of FIG. 2a without the structural supports 18 and the nacelle frame 13 and with some of the cover 17, bearing races 16, shroud 14, and main shaft 11 removed to show the inside of the bearing housing 12. The main shaft is visible passing through the bearing housing 12. A bearing arrangement 20 which may comprise bearings 21 is shown inside the bearing races 16. The bearing arrangement 20 provides a mechanical connection between the main shaft 11 and the bearing housing 12 to allow the main shaft 11 to rotate within the bearing races 16. The bearings 21 may be cylindrical, spherical, or any functional shape. The bearings 21 may produce a low coefficient of friction between the main shaft 11 and the bearing races 16.

The front end of the main shaft 11 may have a flared end which attaches to the hub 5. This may be beneficial for mechanically attaching the main shaft 11 to the hub 5. The shroud 14 may be, as shown in FIGS. 2a and 2b, in contact with the bearing housing 12 and the flared end of the main shaft 11. The shroud 14 may electrically couple the flared end of the main shaft 11 to the bearing housing 12.

Figure 3:
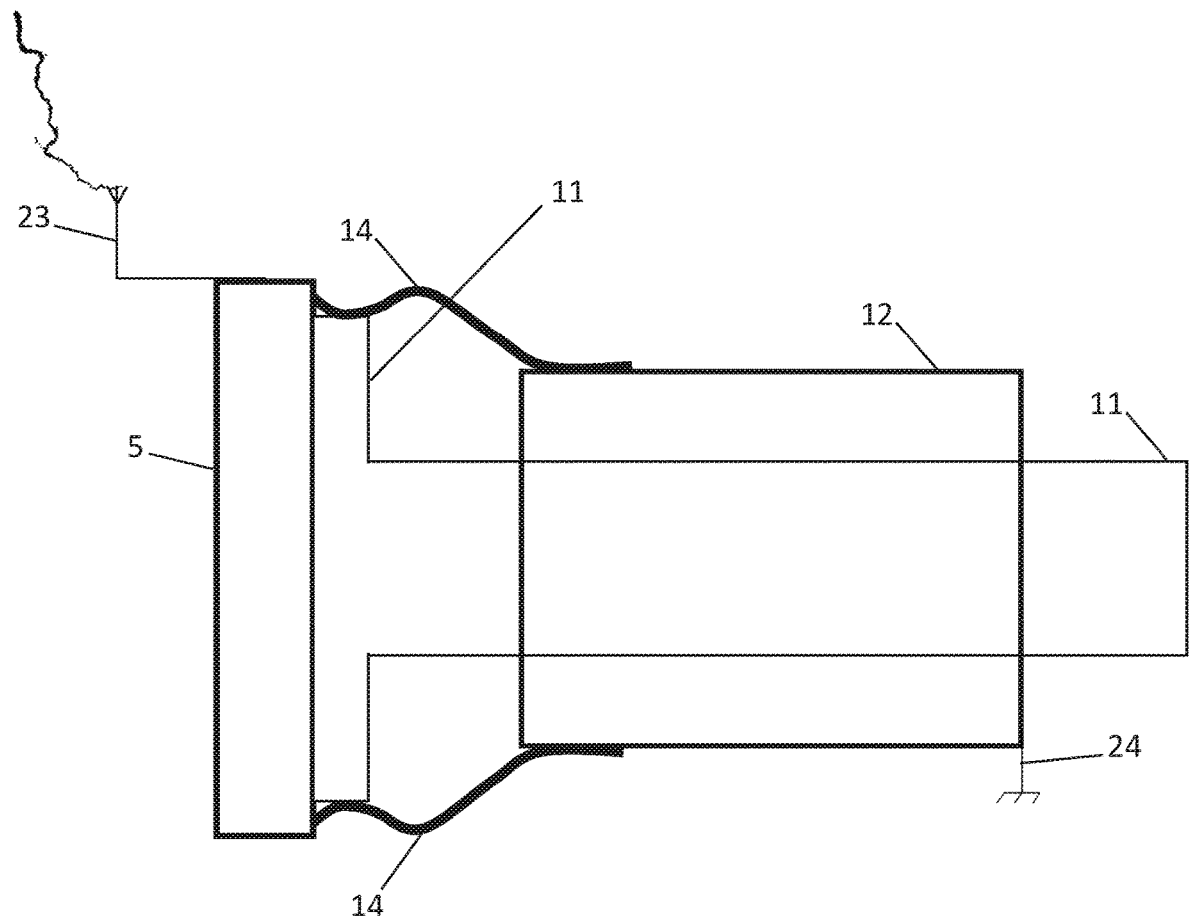
FIG. 3 illustrates, in a schematic side view, an example of an arrangement with a shroud and a conduction path.

FIG. 3 illustrates a schematic side view of the arrangement of FIGS. 2a and 2b with the hub 5 shown attached to the main shaft 11. An electrical ground 24 may be electrically coupled to the bearing housing 12. A lightning strike point 23 is shown as a representation of the point where the lightning initially strikes the wind turbine 1. FIG. 3 shows two electrical conduction paths for the lightning current to take. A first electrical conduction path comprises the lightning strike point 23, the hub 5, the main shaft 11, the bearing arrangement 20, the bearing housing 12 and the electrical ground 24. A second electrical conduction path comprises the lightning strike point 23, the hub 5, the shroud 14, the outside of the bearing housing 12 and the electrical ground 24. Both electrical conduction paths may further comprise a path from the bearing housing 12 to electrical ground 24 via the nacelle frame 13 and the tower 2.

Figure 4:
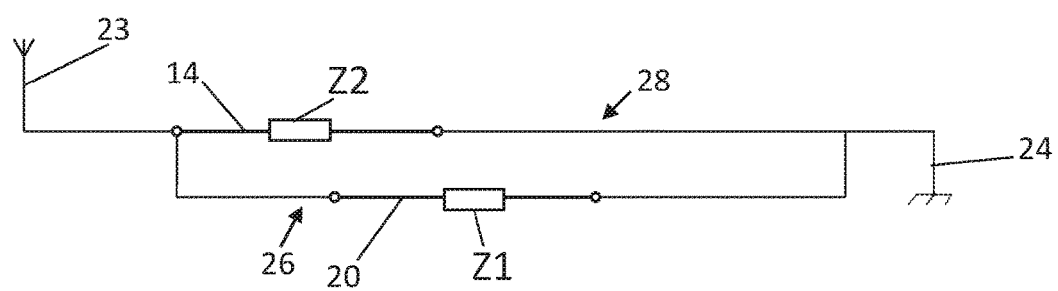
FIG. 4 illustrate, in a circuit diagram, the impedance of two paths the electrical current can take, via a shroud and via a bearing arrangement.

FIG. 4 illustrates a schematic diagram of the circuit paths from the lightning strike point 23 to the electrical ground 24. A first electrical conduction path 26 is from the rotor 4 to electrical ground 24 via the bearing arrangement 20. Specifically, lightning may strike a blade 6 at the lightning strike point 23 and travel along the blade through the hub 5, the main shaft 11, the bearing arrangement 20, the bearing housing 12, and then the nacelle frame 13 to electrical ground 24. However, the bearings 21 of the bearing arrangement 20 may become damaged (for example, fused to surrounding components) if a large current passes through them.

The shroud 14 electrically couples the rotor 4 to the bearing housing 14 via a short circuit path. This provides an electrical conduction path via the shroud 14 which may bypass the bearing arrangement 20. A short circuit path bypassing the bearing arrangement 20 may be a second electrical conduction path 28 which electrically couples the rotor 4 to the bearing housing 12 and to electrical ground 24. This reduces the current passing through the bearing arrangement 20 and reduces the risk of damage to the bearings 21.

In reality, if an electrical source is connected to the lightning strike point 23 the current will "flow" through the first electrical conduction path 26 and the second electrical conduction path 28 in differing proportions. The amount of current "flowing" through each conduction path will depend on two characteristics: the impedance (a function of reactance and resistance); and, the surface area. Resistance is a function of the resistivity of the material, the length of the material, and the cross sectional area of the material.

If the current is in a steady state i.e. direct current (DC) (it has no frequency component), then the only characteristic relevant is the impedance (equivalent to resistance at DC). The proportion of current "flowing" in each path 26 and 28 will depend on the electrical impedance of each path. The impedance associated with the first electrical conduction path 26 is $Z1$. The impedance associated with the second electrical conduction path 28 is $Z2$. $Z1$ is likely to be relatively small due to the large cross sectional area of conducting material comprising the main shaft 11. Thus, it is important that the shroud 14 is made from a material with a low resistivity to reduce $Z2$. The shroud 14 may comprise: copper, an alloy, an alloy comprising copper, a suitable composite, or a combination of these. It is also advantageous for the shroud to be light weight. Although, ideally $Z2$ is much larger than $Z1$ to reduce the current through the bearing arrangement 20. In reality, this is not always practical and surprisingly, not even necessary. Thus, the preferred electrical conduction path from the rotor 4 to electrical ground 24 for a DC current may comprise the main shaft 11 and/or the bearing arrangement 20.

The transient nature of the current within a lightning flash results in several phenomena that need to be addressed in the effective protection wind turbine structures. Rapidly changing currents tend to travel on the surface of a conductor, in what is called the skin effect, unlike direct currents, which "flow-through" the entire cross sectional area of a conductor (like water through a hose). Hence, typically conductors used in the protection of facilities tend to be multi-stranded, with small wires woven together. This increases the total bundle surface area in inverse proportion to the individual strand radius, for a fixed total cross-sectional area.

More specifically, the skin effect describes magnetic field effects that force current onto the outer most multiple concentric, conductive elements. There are three dominant factors that affect the current distribution in a conductive element. The resistance and inductance (i.e. reactance) of each element; these are part of the complex impedance as described above. There is also an interaction through the mutual inductance. The mutual inductance forces the current onto the outermost conductive part; it causes the skin effect. A result of the skin effect is that the current density through a cross sectional area of a conductor is not uniform at AC frequencies. At higher current frequencies there is a greater current density around the edge of the cross sectional area (i.e. the surface of the conductor, or, at the outside diameter of the conductor), which diminishes exponentially towards the centre of the cross sectional area. Even for a hollow circular conductor with a high frequency current, there is a greater current density around the edge of the cross sectional area, which diminishes exponentially towards the inner edge of the cross sectional area.

Thus, without a lightning protection system a transient lightning current conducting through a wind turbine will likely travel on the surface of the hub 5 and the main shaft 11 before traveling though (and potentially damaging) the bearings 21. The addition of the shroud 14 electrically connected to the current dense area on the hub 5 and/or the front of the main shaft 11 provides: (i) the benefit of a large surface area in the second electrical conduction path 28; and, (ii) the extra benefit of a short length conduction path from the current dense area (i.e. the outside surface of the hub 5 and/or the (outside surface of the largest diameter section of the) front of the main shaft 11) contacting the shroud 14 to electrical ground 24. A short length conduction path may minimise (or at least reduce) resistance in the second electrical conduction path 28 (since resistance is a function of conductor length). Both of these effects increase the amount of current "flowing" through the second electrical conduction path 28 when the wind turbine is struck by lightning.

The benefits of the lightning protection system comprising the shroud 14 results in no need for air gaps or spark gaps, this reduces an RF interference caused by a lightning strike and allows for the full benefits of the skin effect to be utilised. Thus, the lightning protection system avoids an air gap, or spark gap, in the electrical conduction path for conducting lightning from the hub 5 to electrical ground 24. The electrically powered components in the blade, such as electrically powered component 8, are protected from lightning strike damage due to the lightning protection system. Specifically, the shroud 14 offers an alternative current path which avoids a large voltage drop across such electrically powered components.

The shroud 14 may allow the hub 5 and/or the main shaft 11 to rotate freely about the bearing housing 12 while still being in electrical contact with the hub 5 and/or the front end of the main shaft 11 and the bearing housing 12.

The shroud 14 may have a diameter greater than the main shaft 11 diameter at the contact with the bearing housing 12 and/or the main shaft 11 diameter between the front end electrical connection and the rear end electrical connection of the shroud 14. For a shroud 14 which fully envelops the circumference of the main shaft 11 and with a diameter greater than the main shaft 11, the second electrical conduction path 28 will have a larger effective cross sectional area than the first conduction path 26. This is because the current density is concentrated near the outside diameter of each conductor (i.e. the shroud 14 and the main shaft 11) and the shroud 14 has a greater outside diameter than the main shaft 11.

Thus due to the skin effect, for transient lightning currents the preferred electrical conduction path from the rotor 4 to electrical ground 24 comprises the shroud 14 (i.e. the second electrical conduction path 28) because of the shroud's comparatively large effective cross sectional area in comparison to the electrical conduction path which comprises the main shaft 11 and the bearing arrangement 20. In addition, the shroud's impedance should be low enough to conduct the transient lightning current effectively to realise the benefits of the skin effect. The Preferred electrical conductor may, conduct over 50% of the total lightning current at an average transient lightning current, or, conduct enough of the total lightning current that the bearing arrangement 20 does not require repair after an average lightning strike.

The shroud 14 may alternatively have a greater diameter than the bearing housing 12 at the contact with the bearing housing 12. The shroud 14 may in addition or alternatively have a greater diameter than the hub 5 and/or the front end of the main shaft at the contact with the hub 5 and/or the front end of the main shaft. The shroud 14 may in addition or alternatively have a diameter at the contact with the hub 5 and/or the front end of the main shaft 11, which is greater than the diameter of the shroud 14 at the contact with the bearing housing 12. The front end of the main shaft 11 in all of these variants may be flared, such that the flared end of the main shaft 11 may have a diameter at the contact with the shroud 14 which is greater than a diameter of the bearing housing 12 at the contact with the shroud 14. All of these variants may be advantageous as it may: reduce the electrical impedance of the shroud 14; create a large shroud 14 surface area; and, increase the ease of manufacturing and functionality.

The shroud 14 may have a relatively small thickness. The shroud 14 may comprise a thickness of less than 10 mm for example. A thinner shroud 14 in comparison to a thicker shroud 14 with the same diameter, will have advantages such as a greater surface area and reduced weight.

The shroud 14 may make sliding or rolling contact with either the bearing housing 12, or the hub 5 and/or the front end of the main shaft 11. The sliding or rolling contact may provide electrical coupling. For a rolling contact the shroud 14 may comprise spherical or cylindrical bearings or any functional shape to facilitate the mechanical connection while allowing the hub 5 and/or the front end of the main shaft 11 to rotate freely about the bearing housing 12 and without causing excessive friction. Any other form of suitable electrical coupling may be used.

The shroud 14 may make sliding or rolling contact with either the bearing housing 12, or the hub 5 and/or the front end of the main shaft 11, at a plurality of discrete contact points around the circumference of the shroud 14. In operation of the wind turbine 1, the hub 5 and main shaft 11 will rotate, this may cause some vibrations in the components of the wind turbine 1. Specifically, the shroud 14 and/or components in contact with the shroud 14 may vibrate and result in partial air gap(s) at certain points of the mechanical connection between the shroud 14 and/or components in contact with the shroud 14, such as in one or more of the plurality of discrete contacts. The degree of electrical contact may therefore need to be maintained above a minimum to ensure good electrical conductivity in the current path through the shroud.

Figure 5A:
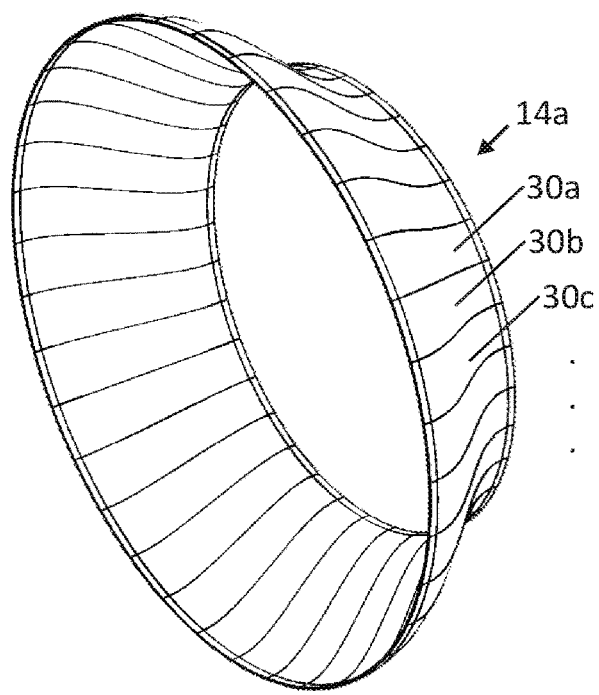
FIG. 5a illustrates, in a schematic isometric view, an example of a shroud.
Figure 5B:
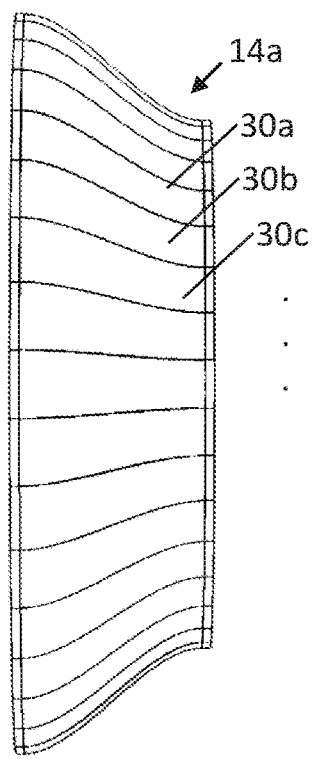

FIGS. 5a and 5b illustrate an example of a suitable shroud 14a with a plurality of discrete contact points around the circumference of the shroud 14a. The shroud 14a may comprise a plurality of metal leaves 30a, 30b, 30c, etc. biased in contact (such that the leaves are flexed) with either the bearing housing 12, or the hub 5 and/or the front end of the main shaft 11. The metal leaves may be biased by the material's own elasticity or outside force. Biasing the metal leaves allows the shroud 14 to be in electrical contact with the either the bearing housing 12, or the hub 5 and/or the front end of the main shaft 11, while still allowing the hub 5 and/or the front end of the main shaft 11 to rotate freely. The metal leaves may be in sliding or rolling contact with either the bearing housing 12, or the hub 5 and/or the front end of the main shaft 11. For a rolling contact the metal leaves may comprise spherical or cylindrical bearings or any functional shape to facilitate the mechanical connection while allowing the hub 5 and/or the front end of the main shaft 11 to rotate freely.

The shroud 14 may be electrically coupled by at least one fixed contact at either the front or rear end of the shroud 14. The front end of the shroud 14 may be electrically connected to the hub 5 and/or the front end of the main shaft 11. The rear end of the shroud 14 may be electrically connected to the bearing housing 12. The shroud 14 may be electrically coupled by at least one sliding or rolling contact at either the rear or front end of the shroud 14.

The shroud 14 may comprise a plurality of sections around the circumference of the shroud 14. These sections may be electrically connected to each other. These sections may be physically touching or separate from each other.

Figure 6A:
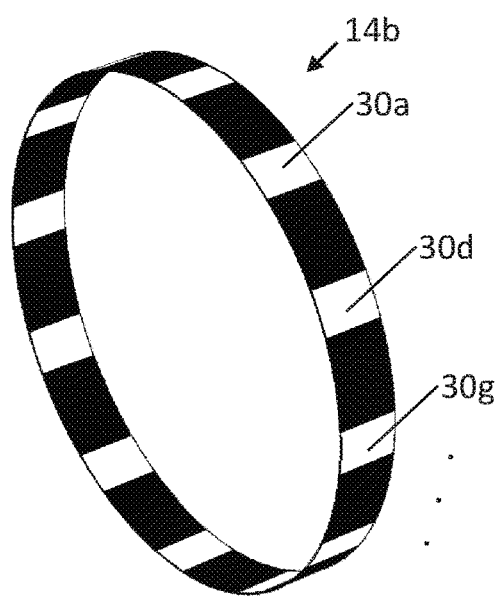
FIG. 6a illustrates, in a schematic isometric view, an example of shroud contact points.

FIG. 6a illustrates an example of a shroud 14b which may have 12 sections. Specifically, the sections are metal leaves 30a, 30d, 30g, etc. which only partially enclose the main shaft 11, or are only partially around the main shaft 11, or partially surround the circumference of the main shaft 11, such that the main shaft would be visible in use. This shroud 14b is a trade-off between a reduced weight/material, and increasing the proportion of transient lighting current in the first electrical conduction path 26. However, it may still reduce the proportion of transient lighting current in the first electrical conduction path 26 enough not to damage the bearings 21. The shroud 14b is purely illustrative and the shroud 14 may have any number of metal leaves and/or contact points to be effective. Due to the effect of vibrations, even though a shroud 14 may have many sections and/or connection points, in operation one or more of those sections and/or connections points may not be in electrical or mechanical connection with the main shaft 11, bearing housing 12, and/or hub 5. In this case, the lightning protection system may still operate correctly, and operate with redundancy, since each section of the shroud 14 may be individually biased.

Figure 6B:
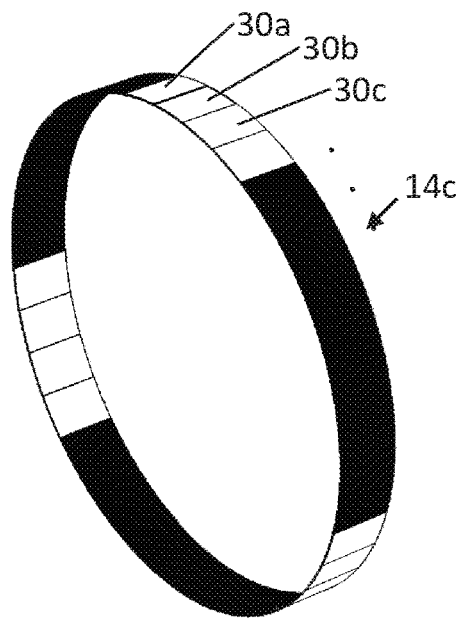
FIG. 6b illustrates, in a schematic isometric view, an example of shroud contact points.

FIG. 6b illustrates an example of a shroud 14c which may also have 12 metal leaves 30a, 30b, 30c, etc. which only partially enclose the main shaft 11, or are only partially around the main shaft 11, or partially surround the circumference of the main shaft 11, such that the main shaft would be visible in use.

Although, shroud 14c has the same number of metal leaves as shroud 14b, it has been found experimentally that shroud 14c conducts a lesser proportion of the transient lightning current than the shroud 14b. Thus, it is advantageous for the shroud 14 to be equally distributed around the circumference of the main shaft 11. Put another way, the mass of the shroud 14 may be equally distributed around the circumference of the main shaft 11. If the shroud 14 comprises sections then the sections may be equidistant form each neighbouring section of the shroud 14.

Figure 7:
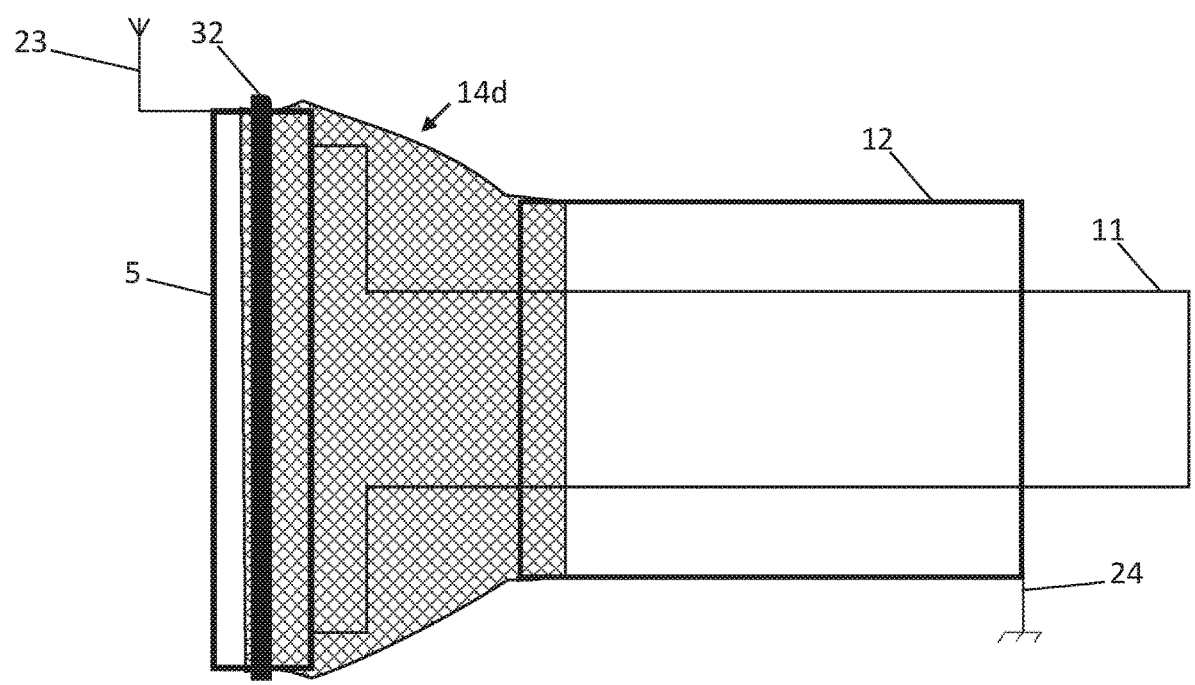
FIG. 7 illustrates, in a schematic side view, an example of an arrangement with a shroud and a conduction path.

FIG. 7 illustrates an example of a shroud 14d. The shroud 14d may alternatively comprise a metal mesh, grid or net. The shroud 14d may further comprise a band or hoop 32 for biasing the shroud in sliding contact with either: (i) the hub 5 and/or the front end of the main shaft 11; or (ii) the bearing housing 12. In the example of FIG. 7, the shroud 14b is mechanically fixed to the bearing housing 12 and is biased by the band or hoop 32 to be in sliding contact with the hub 5.

FIG. 8 *a-d* illustrates non-limiting examples of alternatives to the shroud 14.

Figure 8A:
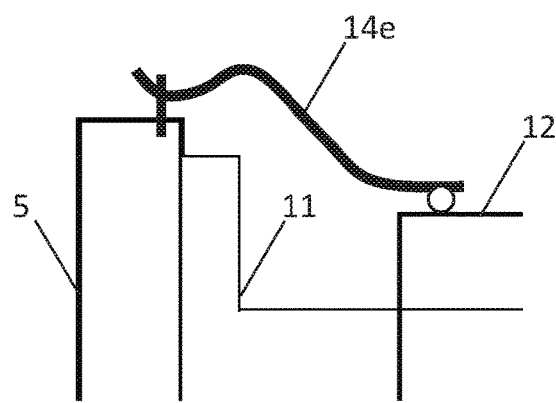
FIGS. 8a-8d illustrate, in a schematic side view, examples of alternative shroud connection arrangements.

FIG. 8a illustrates an example with a shroud 14e (which may be similar to shroud 14a, 14b, or 14c in that it may comprise sections), which is mechanically fixed to the hub 5 and is biased to be in rotary contact with the bearing housing 12. Alternatively, the shroud 14e is mechanically fixed to the front end of the main shaft 11.

Figure 8B:
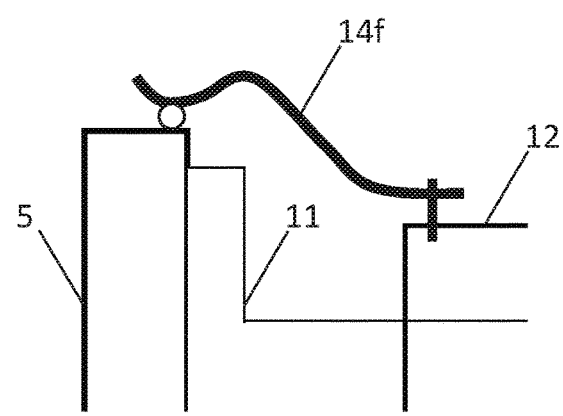

FIG. 8b illustrates an example with a shroud 14f (which may be similar to shroud 14a, 14b, or 14c in that it may comprise sections), which is mechanically fixed to the bearing housing 12 and is biased to be in rotary contact with the hub 5. Alternatively, the shroud 14f is biased to be in rotary contact with the bearing housing 12.

Figure 8C:
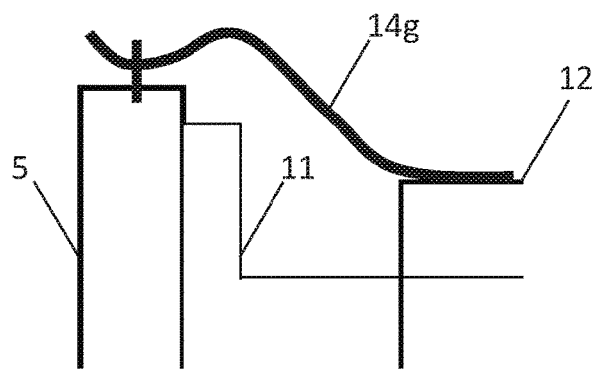

FIG. 8c illustrates an example with a shroud 14g (which may be similar to shroud 14a, 14b, or 14c in that it may comprise sections), which is mechanically fixed to the hub 5 and is biased to be in sliding contact with the bearing housing 12. Alternatively, the shroud 14g is mechanically fixed to the front end of the main shaft 11.

Figure 8D:
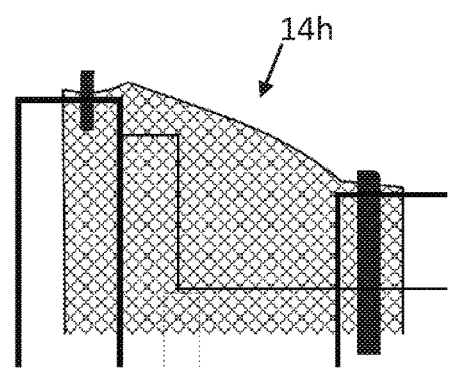

FIG. 8d illustrates an example with a shroud 14h (which may be similar to shroud 14d in that it may comprise a metal mesh, grid, or net), which is mechanically fixed to the hub 5 and is biased to be in sliding contact with the bearing housing 12. Alternatively, the shroud 14g is mechanically fixed to the front end of the main shaft 11. An example of biasing the shroud may be with a bungee or hoop elastically biased to be in sliding contact.

In another non-limiting example of an alternative to the shroud 14, the shroud may comprise of two sections. A first section at a first end may be mechanically fixed to the bearing casing 12 and a second section may be mechanically fixed at a first end to either the hub 5 and/or main shaft 11. The two sections may then form an electrical and mechanical connection at their second ends via a sliding or rolling contact as described previously.

In another non-limiting example of an alternative to the shroud 14 described above, the shroud 14 may comprise a third mechanical and/or electrical connection between the first connection point at the hub 5 and/or the main shaft 11 and the second connection point at the bearing housing 12. This third contact point may not be designed for carrying the weight of the shroud 14, but may be designed as another conduction path to carry electrical current away from the main shaft and to the bearing housing 12.

In other non-limiting examples of an alternative to the shroud 14, the rolling contact the shroud 14 may make with either the bearing housing 12, or the hub 5 and/or the front end of the main shaft 11, may comprise wheels that roll along either the bearing housing 12, or the hub 5 and/or the front end of the main shaft 11. Alternatively, rolling contact may comprise bearings, such as ball bearings and/or sacrificial bearings.

Although the invention has been described above with reference to one or more preferred embodiments, it will be appreciated that various changes or modifications may be made without departing from the scope of the invention as defined in the appended claims.

The invention claimed is:
1. A wind turbine comprising:
   a rotor comprising a hub and a plurality of blades that project outwardly from the hub;
   a main shaft attached to the hub at a front end and extending to a gearbox or generator at a rear end;
   a bearing housing for rotatably supporting the main shaft via a bearing arrangement; and
   a lightning current protection system providing an electrical conduction path suitable for conducting lightning from the rotor to electrical ground, wherein the bearing housing is electrically connected to electrical ground, the lightning current protection system includes a shroud forming part of the electrical conduction path, wherein a rear end of the shroud is in contact with the bearing housing and a front end of the shroud is in contact with the hub and/or the front end of the main shaft, and the shroud electrically couples the rotor to the bearing housing via a short circuit path that bypasses the bearing arrangement, wherein the shroud is arranged around the front end of the main shaft.

2. The wind turbine of claim 1, wherein the shroud has a greater diameter than the main shaft at the contact with the bearing housing.

3. The wind turbine of claim 1, further comprising a nacelle containing the bearing housing, wherein the shroud is enclosed within the nacelle.

4. The wind turbine of claim 1, wherein the shroud makes a sliding or rolling contact with either: (i) the hub and/or the front end of the main shaft; or (ii) the bearing housing, and the sliding or rolling contact provides electrical coupling.

5. The wind turbine of claim 4, wherein the shroud makes a sliding contact with either: (i) the hub and/or the front end of the main shaft; or (ii) the bearing housing at a plurality of discrete contact points around the circumference of the shroud.

6. The wind turbine of claim 1, wherein the shroud is electrically coupled by at least one fixed contact at either the front or rear end of the shroud and electrically coupled by at least one sliding or rolling contact at either the rear or front end of the shroud.

7. The wind turbine of claim 1, wherein the shroud comprises a plurality of metal leaves biased in contact with either the bearing housing or the hub and/or the front end of the main shaft.

8. The wind turbine of claim 1, wherein the shroud comprises a metal mesh, grid or net.

9. The wind turbine of claim 8, wherein the shroud further comprises a band or hoop for biasing the shroud in sliding contact with either: (i) the hub and/or the front end of the main shaft; or (ii) the bearing housing.

10. The wind turbine of claim 1, wherein:
the front end of the main shaft has a flared end which attaches to the hub;
the shroud is in contact with the bearing housing and the flared end of the main shaft; and
the shroud electrically couples the flared end of the main shaft to the bearing housing.

11. The wind turbine of claim 10, wherein the flared end of the main shaft has a diameter at the contact with the shroud which is greater than a diameter of the bearing housing at the contact with the shroud.

12. The wind turbine of claim 1, wherein the lightning current protection system avoids an air gap, or spark gap, in the electrical conduction path for conducting lightning from the hub to electrical ground.

13. The wind turbine of claim 1, wherein the shroud includes copper.

14. The wind turbine of claim 1, wherein the bearing housing includes steel.

15. The wind turbine of claim 1, wherein at least one of the plurality of blades includes an electrically powered component which receives electrical power via the hub.

16. The wind turbine of claim 1, wherein there are at least two electrical conduction paths from the rotor to electrical ground, one via the shroud and one via the main shaft and/or the bearing arrangement.

17. The wind turbine of claim 16, wherein the preferred electrical conduction path from the rotor to electrical ground for a DC current is via the main shaft and/or the bearing arrangement, and/or wherein the preferred electrical conduction path from the rotor to electrical ground for a transient lightning current is via the shroud.

18. The wind turbine of claim 1, wherein the shroud provides at least one continuous electrical conduction path from the hub and/or the front end of the main shaft to the bearing housing.

* * * * *